Oct. 24, 1933.  G. HEINISH  1,932,370
GAS VALVE CONSTRUCTION
Filed Oct. 3, 1930   2 Sheets-Sheet 1
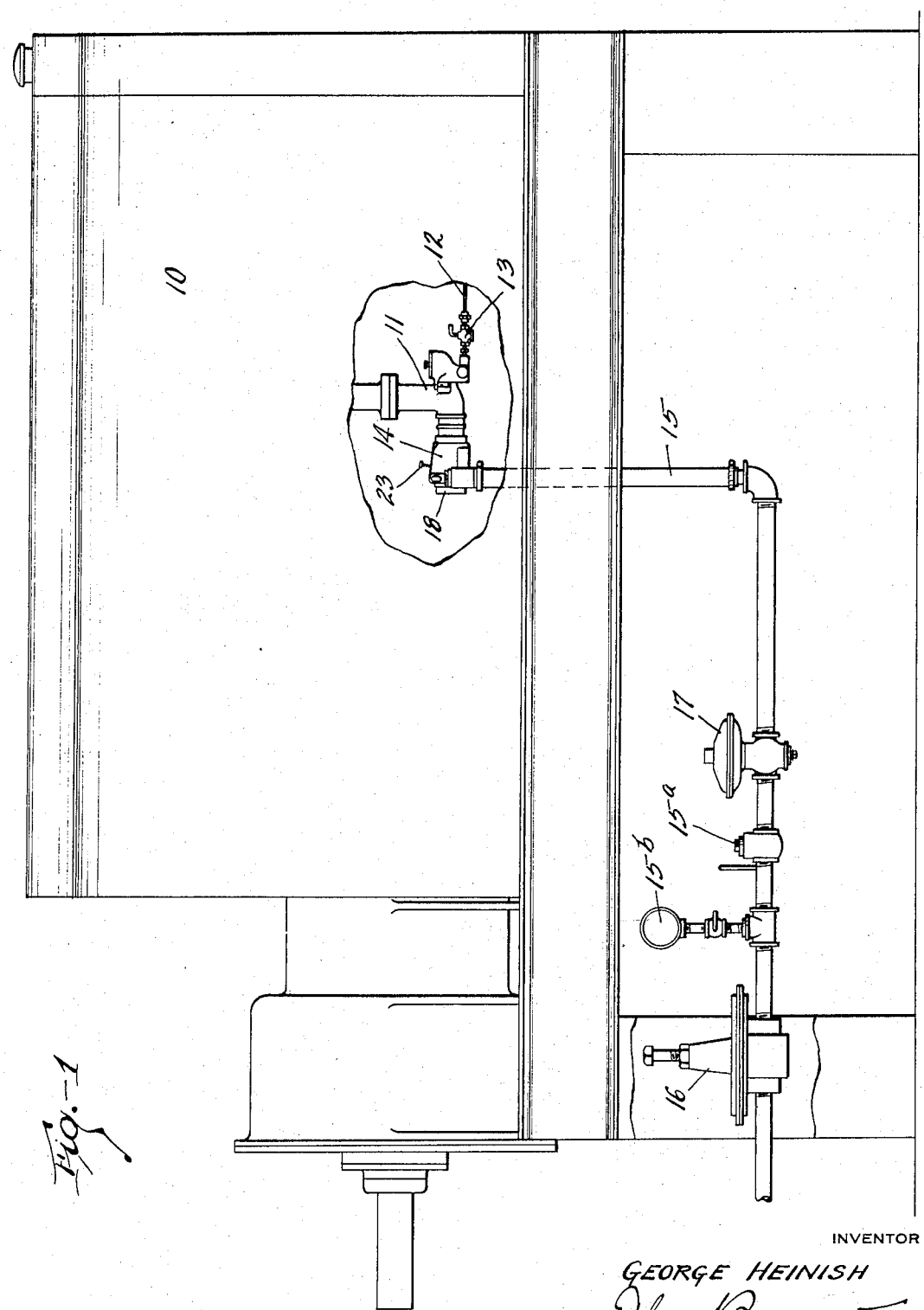
INVENTOR
GEORGE HEINISH
BY
Ely & Barrow
ATTORNEYS Oct. 24, 1933.                G. HEINISH                1,932,370
                          GAS VALVE CONSTRUCTION
                   Filed Oct. 3, 1930          2 Sheets-Sheet 2
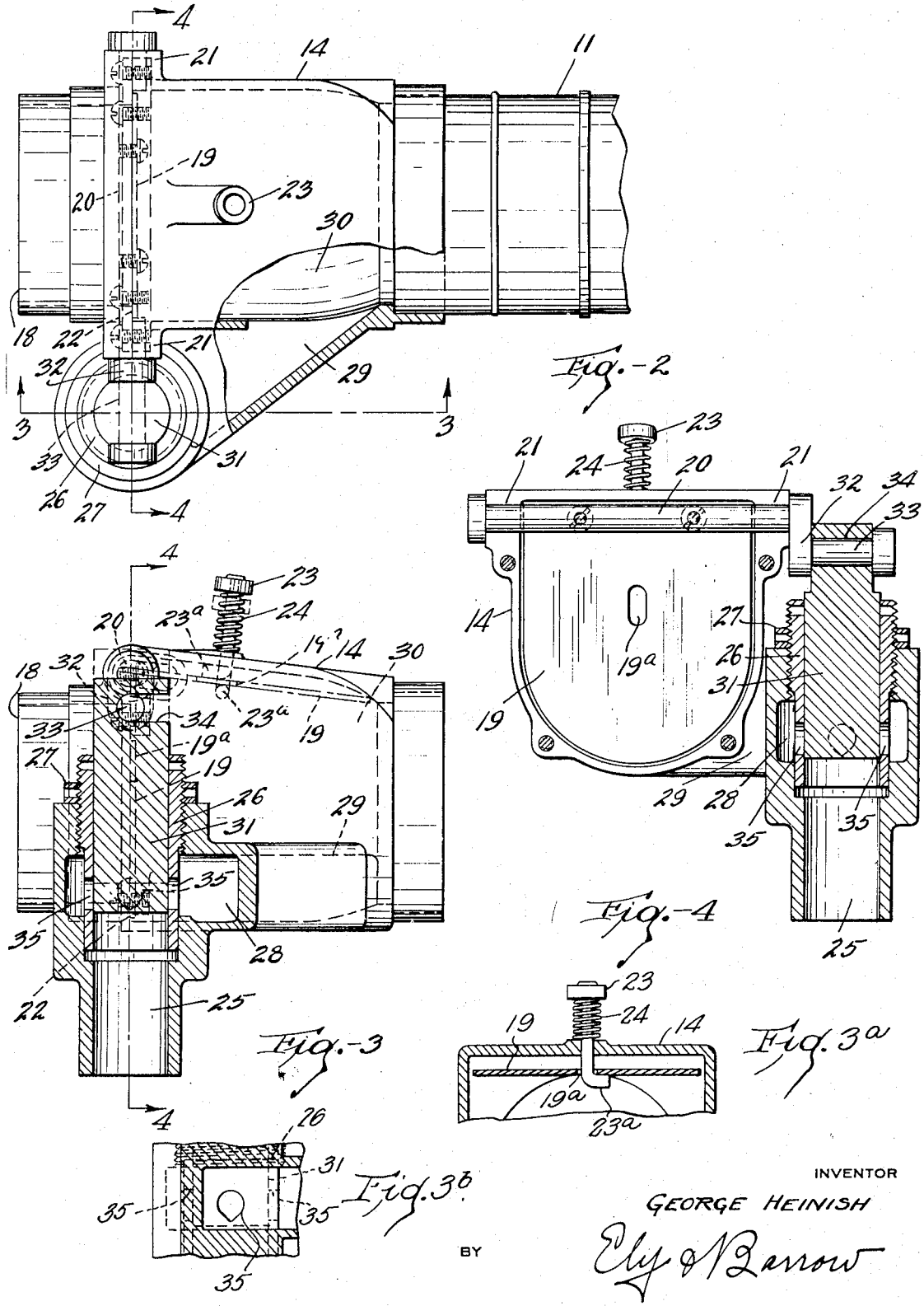
INVENTOR
GEORGE HEINISH
BY
ATTORNEYS Patented Oct. 24, 1933

1,932,370

UNITED STATES PATENT OFFICE 1,932,370

GAS VALVE CONSTRUCTION

George Heinish, Cuyahoga Falls, Ohio, assignor to The Star Drilling Machine Company, Akron, Ohio, a corporation of Ohio Application October 3, 1930. Serial No. 486,164

13 Claims. (Cl. 123—120)

This invention relates to gas valves for adapting internal combustion engines designed for gasoline as fuel so that natural gas may be employed.

For many industrial purposes, such as for power units used in the oil or other well-drilling regions, it is desirable to adapt internal combustion engines normally designed for gasoline as fuel to use gaseous fuel instead, such gas being frequently available at cheap rates in various locations.

Heretofore, a number of gas valves for use with such power units have been on the market, but these have not been entirely satisfactory for a number of reasons. Of these, one type provides a plurality of adjustments. It is possible to adjust this valve to work under one condition of gas pressure with gas of unvarying qualities or properties, but it will not function at all at another condition of pressure or with gas of varying qualities. Another type of valve on the market has no provision for adjustments and this type has a very limited range of speeds and will not perform under load at slow engine speed.

Moreover, none of the valves heretofore produced have been designed with regard to the operation, under the varying conditions of pressure and flow of gas due to changing engine speeds, of the pressure regulators used on the gas line. It has been discovered that whereas a regulator is able to deliver the largest quantity of gas at the slowest speeds of the engine and the least quantity of gas at the highest speeds, the engine requirements are just the reverse. It has also been discovered that variations in the regulator inlet pressure produce a marked effect upon the quantity of gas delivered and at slow engine speeds a high inlet pressure tends to cause the greatest amount of gas to pass through the regulator.

The general purposes of the invention are to design a gas valve in the light of these discoveries so that the gas and air are admixed by the air current through the valve body in the proper proportions; so that the bad feature of the regulator in delivering too much gas at slow speeds and too little at high speeds is compensated for by the valve; so that the valve may be adjusted for idling conditions; and so that a single valve may be accommodated to different sizes of engines within certain limits.

A further purpose of the invention is to provide in combination a gas valve and pressure regulating equipment designed to maintain the supply of gas at pressures such that the engine will operate with maximum efficiency.

The foregoing and other purposes or objects of the invention are attained in the apparatus disclosed in the accompanying drawings and described below. It is to be understood that the invention is not limited to the specific form thereof shown and described.

Of the accompanying drawings,

Figure 1 is a side elevation of a power unit installation showing the improved apparatus installed therein;

Figure 2 is an enlarged plan view of the gas valve;

Figure 3 is a section on line 3—3 of Figure 2;

Figure 3ª is a part section on line 3ª—3ª of Figure 3 showing the air control flap valve hooked up in an open position as indicated in dot and dash lines in Figure 3;

Figure 3ᵇ is a part section on line 3ᵇ—3ᵇ of Figure 3; and

Figure 4 is a section on line 4—4 of Figure 2.

Referring to the drawings, the numeral 10 designates a power unit installation in which a gasoline carburetor 11 is employed to which gasoline may be supplied by a line 12 on which is a shut-off valve 13.

The improved gas valve 14 may be attached to the air intake of carburetor 11 as shown to supply a mixture of gas and air to the intake manifold of the engine. Supply of gas to the valve 14 may be provided from a supply line 15 through a high pressure regulator 16 and a sensitive low pressure regulator 17 of a known type using balanced regulator valves. This arrangement is made to keep the inlet pressure to the sensitive regulator as constant as is possible under the varying rates of flow therethrough when the engine is in operation, the sensitive regulator being thus adapted the more nearly to maintain the pressure and deliver the required quantities of gas at various engine speeds.

The valve 14 is formed with an air intake opening at 18 and has therein an air supply controlling valve member comprising a flap 19 secured on a shaft 20 pivoted in the housing of valve 14 as at 21, 21 and arranged to swing inwardly under the action of engine suction, the valve normally seating preferably under the action of gravity against a shoulder 22 on the inside of the valve body. The flap 19 may be secured in an open position to permit operation of the power unit by gasoline by the provision of a bayonet hook member 23 supported by a spring 24 on housing of valve 11 and extending through the housing, the hook 23ª being engageable through a slot 19ª in flap 19 (see upper dotted line position of flap in Figure 3) and rotatable releasably to secure the flap at the top of the valve body.

To admit the gas to the valve body an inlet duct is provided in the housing 14 at 25 in the bore of which is preferably arranged a removable adjustable valve cage 26 which may be threaded through the top of the valve casing and which may be secured in adjusted positions by the nut 27. This cage extends through the gas delivery chamber 28 which is in communication with the mixing chamber 30 through the port 29.

Within the cage 26 there is arranged a valve plunger 31 which extends upwardly out of the cage and is operable by a crank 32 on shaft 20, the pin 33 of which crank is engaged in a slot 34 extending inwardly from one side of the plunger so that swinging movement of the crank caused by swinging of the flap 19 will raise and lower the plunger 31 in the valve cage 26. The crank is so arranged on shaft 20 that upward swinging of the flap 19 will raise the plunger 31 which normally will remain down in its lowermost position preferably under the weights of the flap and the weight of the plunger acting on the crank.

Ports 35, 35 are arranged in cage 26 with which plunger 31 cooperates to control the flow of gas into chamber 28 and mixing chamber 30. These ports preferably are of such shape as shown (Figure 4) so that initial upwardly movement of plunger 31 very slightly opens the ports, the width of the port increasing quite gradually. The cage 26 is preferably initially adjusted with respect to the plunger so that sufficient gas may be delivered by the valve for idling.

It will be apparent that in operation the air valve 19 actuates the gas valve plunger 31 to deliver gas to the mixing chamber 30 in the correct proportion to the entering air. As the engine speeds up the increased velocity of the air opens flap 19 farther and it in turn actuates plunger 31 to open ports 35 wider. It is to be noted that by reason of the crank action the opening of the ports 35 at slower engine speeds is very slight. This crank action is such that while the air valve has a uniform increase in opening the gas valve varies from a very gradual opening at the start to an increasingly fast one at the latter part of the crank stroke and this compensates for the bad feature of the regulator which tends to supply more gas at the slower speeds. The removable and adjustable valve cage 26 permits of supplying different replaceable valve cages to adapt the valves for engines of different sizes within certain limits and also provides for initial adjustment of the valve for idling.

A shut off valve 15ª and pressure gage 15ᵇ may be arranged on line 15 in advance of regulator 17.

Modifications of the invention may be resorted to without departing from the spirit thereof or the scope of the appended claims.

What is claimed is:—

1. Apparatus for adapting gasoline internal combustion engines to the use of gas comprising a valve construction having an air inlet, a flap pivoted in said inlet to be operated by the velocity of air drawn through the valve by the engine, a crank on said flap, said valve construction also having an inlet for gas and a mixing chamber, a valve for controlling the gas inlet, said valve including a cage having ports therein through which gas may be delivered to the mixing chamber, and a plunger in said cage, said plunger being interengaged with said crank, said flap, crank and plunger being so arranged and said ports being so shaped that movement of the flap effects an opening of the gas valve quite slowly at first and at a gradually increasing rate as the flap opens wide, said cage being adjustable with respect to the plunger to set the valve for idling and said cage being removable from the valve for replacement by cages designed for engines of different sizes, a gas supply line, a high pressure regulator on said line, and a low pressure regulator on the line between the high pressure regulator and said gas valve.

2. Apparatus for adapting gasoline internal combustion engines to the use of gas comprising a valve construction having an air inlet, a flap pivoted in said inlet to be operated by the velocity of air drawn through the valve by the engine, a crank on said flap, said valve construction also having an inlet for gas and a mixing chamber, a valve for controlling the gas inlet, said valve including a cage having ports therein through which gas may be delivered to the mixing chamber, and a plunger in said cage, said plunger being interengaged with said crank, said flap, crank and plunger being so arranged and said ports being so shaped that movement of the flap effects an opening of the gas valve quite slowly at first and at a gradually increasing rate as the flap opens wide, said cage being adjustable with respect to the plunger to set the valve for idling, a gas supply line, a high pressure regulator on said line, and a low pressure regulator on the line between the high pressure regulator and said gas valve.

3. Apparatus for adapting gasoline internal combustion engines to the use of gas comprising a valve construction having an air inlet, a flap pivoted in said inlet to be operated by the velocity of air drawn through the valve by the engine, a crank on said flap, said valve construction also having an inlet for gas and a mixing chamber, a valve for controlling the gas inlet, said valve including a cage having ports therein through which gas may be delivered to the mixing chamber, a plunger in said cage, said plunger being interengaged with said crank, said flap, crank and plunger being so arranged and said ports being so shaped that movement of the flap effects an opening of the gas valve quite slowly at first and at a gradually increasing rate as the flap opens wide, said cage being removable from the valve for replacement by cages designed for engines of different sizes, a gas supply line, a high pressure regulator on said line, and a low pressure regulator on the line between the high pressure regulator and said gas valve.

4. Apparatus for adapting gasoline internal combustion engines to the use of gas comprising a valve construction having an air inlet, a flap pivoted in said inlet to be operated by the velocity of air drawn through the valve by the engine, a crank on said flap, said valve construction also having an inlet for gas and a mixing chamber, a valve for controlling the gas inlet, said valve including a cage having ports therein through which gas may be delivered to the mixing chamber, a plunger in said cage, said plunger being interengaged with said crank, said flap, crank and plunger being so arranged and said ports being so shaped that movement of the flap effects an opening of the gas valve quite slowly at first and at a gradually increasing rate as the flap opens wide, a gas supply line, a high pressure regulator on said line, and a low pressure regulator on the line between the high pressure regulator and said gas valve.

5. Apparatus for adapting gasoline internal combustion engines to the use of gas comprising a valve construction having an air inlet, a flap pivoted in said inlet to be operated by the velocity of air drawn through the valve by the engine, a crank on said flap, said valve construction also having an inlet for gas and a mixing chamber, a valve for controlling the gas inlet, said valve including a cage having ports therein through which gas may be delivered to the mixing chamber, a plunger in said cage, said plunger being interengaged with said crank, said flap, crank and plunger being so arranged that movement of the flap effects an opening of the gas valve quite slowly at first and at a gradually increasing rate as the flap opens wide, a gas supply line, a high pressure regulator on said line, and a low pressure regulator on the line between the high pressure regulator and said gas valve.

6. Apparatus for adapting gasoline internal combustion engines to the use of gas comprising a valve construction having an air inlet, a flap pivoted in said inlet to be operated by the velocity of air drawn through the valve by the engine, a crank on said flap, said valve construction also having an inlet for gas and a mixing chamber, a valve for controlling the gas inlet, said valve including a cage having ports therein through which gas may be delivered to the mixing chamber, a plunger in said cage, said plunger being interengaged with said crank, said flap, crank and plunger being so arranged and said ports being so shaped that movement of the flap effects an opening of the gas valve quite slowly at first and at a gradually increasing rate as the flap opens wide, a gas supply line, and a pressure regulator on the line.

7. Apparatus for adapting gasoline internal combustion engines to the use of gas comprising a valve construction having an air inlet, a flap pivoted in said inlet to be operated by the velocity of air drawn through the valve by the engine, a crank on said flap, said valve construction also having an inlet for gas and a mixing chamber, a valve for controlling the gas inlet, said valve including a cage having ports therein through which gas may be delivered to the mixing chamber, a plunger in said cage, said plunger being interengaged with said crank, said flap, crank and plunger being so arranged that movement of the flap effects an opening of the gas valve quite slowly at first and at a gradually increasing rate as the flap opens wide, a gas supply line, and a pressure regulator on the line.

8. Apparatus for adapting gasoline internal combustion engines to the use of gas comprising a valve construction having an air inlet, a flap pivoted in said inlet to be operated by the velocity of air drawn through the valve by the engine, a crank on said flap, said valve construction also having an inlet for gas and a mixing chamber, a valve for controlling the gas inlet, said valve including a cage having ports therein through which gas may be delivered to the mixing chamber, and a plunger in said cage, said plunger being interengaged with said crank, said flap, crank and plunger being so arranged and said ports being so shaped that movement of the flap effects an opening of the gas valve quite slowly at first and at a gradually increasing rate as the flap opens wide.

9. Apparatus for adapting gasoline internal combustion engines to the use of gas comprising a valve construction having an air inlet, a flap pivoted in said inlet to be operated by the velocity of air drawn through the valve by the engine, a crank on said flap, said valve construction also having an inlet for gas and a mixing chamber, a valve for controlling the gas inlet, said valve including a cage having ports therein through which gas may be delivered to the mixing chamber, and a plunger in said cage, said plunger being interengaged with said crank, said flap, crank and plunger being so arranged and said ports being so shaped that movement of the flap effects an opening of the gas valve quite slowly at first and at a gradually increasing rate as the flap opens wide.

10. A gas valve construction adapted for attachment to the air intake of a gasoline carburetor on an internal combustion engine, said valve construction having an air inlet and a normally closed valve member therein, and means for releasably holding said valve member open so as not to restrict the flow of air through said inlet to permit the normal operation of the carburetor without removal of the gas valve.

11. A gas valve construction for adapting gasoline internal combustion engines to the use of a gaseous fuel, said valve having an air inlet, an air valve controlling said air inlet, a gas inlet, a gas valve controlling said gas inlet, and means connecting the air valve to the gas valve to operate the latter from the former, said air valve being operable by the velocity of air drawn into the engine, and said connecting means comprising a crank so arranged that the gas valve is opened at a slower rate compared to the air valve at the start, which rate gradually increases as the air valve opens wider.

12. A gas valve construction for adapting gasoline internal combustion engines to the use of a gaseous fuel, said valve having an air inlet, an air valve controlling said air inlet, a gas inlet, a gas valve controlling said gas inlet, and means connecting the air valve to the gas valve to operate the latter from the former, said air valve being operable by the velocity of air drawn into the engine, and said connecting means being operable that the gas valve is opened at a slower rate compared to the air valve at the start, which rate gradually increases as the air valve opens wider.

13. A gas valve construction for adapting gasoline internal combustion engines to the use of a gaseous fuel, said valve having an air inlet, an air valve controlling said air inlet, a gas inlet, a gas valve controlling said gas inlet, and means connecting the air valve to the gas valve to operate the latter from the former, said connecting means being operable that the gas valve is opened at a slower rate compared to the air valve at the start, which rate gradually increases as the air valve opens wider.

GEORGE HEINISH.